(12) United States Patent
Gobush

(10) Patent No.: US 8,872,914 B2
(45) Date of Patent: Oct. 28, 2014

(54) ONE CAMERA STEREO SYSTEM

(75) Inventor: William Gobush, North Dartmouth, MA (US)

(73) Assignee: Acushnet Company, Fairhaven, MA (US)

(*) Notice: Subject to any disclaimer, the term of this patent is extended or adjusted under 35 U.S.C. 154(b) by 1679 days.

(21) Appl. No.: 10/770,457

(22) Filed: Feb. 4, 2004

(65) Prior Publication Data

US 2005/0168578 A1 Aug. 4, 2005

(51) Int. Cl.
| | |
|---|---|
| H04N 7/18 | (2006.01) |
| A63B 69/36 | (2006.01) |
| H04N 13/02 | (2006.01) |
| A63B 69/00 | (2006.01) |
| A63B 24/00 | (2006.01) |
| A63B 69/38 | (2006.01) |

(52) U.S. Cl.
CPC ......... *A63B 24/0021* (2013.01); *A63B 69/0002* (2013.01); *A63B 2024/0034* (2013.01); *A63B 69/3614* (2013.01); *A63B 69/3658* (2013.01); *A63B 69/38* (2013.01); *A63B 2243/007* (2013.01); *H04N 13/0217* (2013.01)
USPC ....................................................... 348/135

(58) Field of Classification Search
USPC ....... 348/42, 135; 349/11; 382/284; 396/351; 250/206.1; 700/91; 356/601
See application file for complete search history.

(56) References Cited

U.S. PATENT DOCUMENTS

| | | |
|---|---|---|
| 1,876,657 A | 5/1932 | Fox |
| 2,472,893 A | 6/1949 | Lyle |
| 2,610,504 A | 4/1952 | Nigh |
| 2,660,880 A | 12/1953 | Vivian |
| 2,755,658 A | 7/1956 | Brown |
| 2,783,999 A | 3/1957 | Simjian |
| 2,825,569 A | 3/1958 | Alvarez |
| 2,933,681 A | 4/1960 | Crain |
| 3,016,812 A | 1/1962 | Chatlain |
| 3,091,466 A | 5/1963 | Speiser |
| 3,160,011 A | 12/1964 | Ogden |
| 3,173,348 A | 3/1965 | Betinis |
| 3,182,508 A | 5/1965 | Varju |
| 3,270,564 A | 9/1966 | Evans |
| 3,353,282 A | 11/1967 | Sneed |
| 3,359,005 A | 12/1967 | Cameron |
| 3,364,751 A | 1/1968 | Cornell et al. |

(Continued)

FOREIGN PATENT DOCUMENTS

| | | |
|---|---|---|
| CA | 946863 | 5/1974 |
| WO | WO0043936 | 11/2000 |

*Primary Examiner* — Allen Wong

(74) *Attorney, Agent, or Firm* — Smith, Gambrell & Russell, LLP

(57) ABSTRACT

A one camera system that measures golf club and golf ball kinematics is disclosed. Preferably, a plurality of retroreflective or fluorescent markers are placed on the surface of a golf ball. Using a single strobe lamps, images of a golf ball at two points in motion are acquired. The output of each of the strobe lamps is preferably filtered to pass predetermined colors of light. The input to each of the cameras is also preferably filtered. The output from the strobe lamp passes through at least one of a beam splitting mirror and reflective front surface mirror. Based on the filtered light outputs generated by the strobe lamp and the filtered camera input, at least two images of the golf ball, taken from two different angles, may be acquired. The acquired images may be used to analyze the kinematics of the golf ball.

37 Claims, 6 Drawing Sheets

(56) References Cited

U.S. PATENT DOCUMENTS

| | | | |
|---|---|---|---|
| 3,408,750 | A | 11/1968 | McCollough et al. |
| 3,429,571 | A | 2/1969 | Abel, Jr. |
| 3,469,905 | A | 9/1969 | Baldwin et al. |
| 3,508,440 | A | 4/1970 | Murphy |
| 3,513,707 | A | 5/1970 | Russell |
| 3,566,668 | A | 3/1971 | Browning |
| 3,589,732 | A | 6/1971 | Russell et al. |
| 3,598,976 | A | 8/1971 | Russell |
| 3,630,601 | A | 12/1971 | Lehovec |
| 3,633,007 | A | 1/1972 | Sanders |
| 3,633,008 | A | 1/1972 | Sanders |
| 3,671,724 | A | 6/1972 | Sanders |
| 3,717,857 | A | 2/1973 | Evans |
| 3,759,528 | A | 9/1973 | Christophers |
| 3,788,647 | A | 1/1974 | Evans |
| 3,792,863 | A | 2/1974 | Evans |
| 3,793,481 | A | 2/1974 | Ripley et al. |
| 3,804,518 | A | 4/1974 | Meyr |
| 3,806,131 | A | 4/1974 | Evans |
| 3,818,341 | A | 6/1974 | Burdick |
| 3,820,133 | A | 6/1974 | Adorney et al. |
| 3,918,073 | A | 11/1975 | Henderson et al. |
| 3,935,669 | A | 2/1976 | Potrzuski et al. |
| 3,945,646 | A | 3/1976 | Hammond |
| 3,992,012 | A | 11/1976 | Campbell |
| 4,005,261 | A | 1/1977 | Sato et al. |
| 4,025,718 | A | 5/1977 | Paretti |
| 4,033,318 | A | 7/1977 | O'Grady |
| 4,041,293 | A | 8/1977 | Kihlberg |
| 4,063,259 | A | 12/1977 | Lynch et al. |
| 4,088,324 | A | 5/1978 | Farmer |
| 4,136,387 | A | 1/1979 | Sullivan et al. |
| 4,137,566 | A | 1/1979 | Haas et al. |
| 4,138,118 | A | 2/1979 | Budney |
| 4,148,096 | A | 4/1979 | Haas et al. |
| 4,155,555 | A | 5/1979 | Fink |
| 4,158,853 | A | 6/1979 | Sullivan et al. |
| 4,160,942 | A | 7/1979 | Lynch et al. |
| 4,223,891 | A | 9/1980 | Van Gaasbeek et al. |
| 4,239,227 | A | 12/1980 | Davis |
| 4,306,722 | A | 12/1981 | Rusnak |
| 4,306,723 | A | 12/1981 | Rusnak |
| 4,327,918 | A | 5/1982 | Foster |
| 4,342,054 | A | 7/1982 | Terui et al. |
| 4,360,199 | A | 11/1982 | Jackson |
| 4,375,887 | A | 3/1983 | Lynch et al. |
| 4,461,477 | A | 7/1984 | Stewart |
| 4,477,079 | A | 10/1984 | White |
| 4,570,607 | A | 2/1986 | Stokes |
| 4,580,786 | A | 4/1986 | Shipley |
| 4,630,829 | A | 12/1986 | White |
| 4,640,120 | A | 2/1987 | Garritano et al. |
| 4,684,133 | A | 8/1987 | Maroth |
| 4,695,888 | A | 9/1987 | Peterson |
| 4,695,891 | A | 9/1987 | Peterson |
| 4,711,754 | A | 12/1987 | Bednar |
| 4,713,686 | A | 12/1987 | Ozaki et al. |
| 4,759,219 | A | 7/1988 | Cobb et al. |
| 4,822,042 | A | 4/1989 | Landsman |
| 4,830,377 | A | 5/1989 | Kobayashi |
| 4,834,376 | A | 5/1989 | Steinberg |
| 4,844,469 | A | 7/1989 | Yasuda et al. |
| 4,858,934 | A | 8/1989 | Ladick et al. |
| 4,861,034 | A | 8/1989 | Lee |
| 4,870,868 | A | 10/1989 | Gastgeb et al. |
| 4,893,182 | A | 1/1990 | Gautraud et al. |
| 4,898,388 | A | 2/1990 | Beard, III et al. |
| 4,898,389 | A | 2/1990 | Plutt |
| 4,930,787 | A | 6/1990 | Nobles, Jr. |
| 4,940,236 | A | 7/1990 | Allen |
| 4,967,596 | A | 11/1990 | Rilling et al. |
| 4,991,850 | A | 2/1991 | Wilhlem |
| 4,991,851 | A | 2/1991 | Melesio |
| 5,031,909 | A | 7/1991 | Pecker |
| 5,054,785 | A | 10/1991 | Gobush et al. |
| 5,056,791 | A | 10/1991 | Poillin et al. |
| 5,082,283 | A | 1/1992 | Conley et al. |
| 5,101,268 | A | 3/1992 | Ohba |
| 5,111,410 | A | 5/1992 | Nakayama et al. |
| 5,118,102 | A | 6/1992 | Bahill et al. |
| 5,131,660 | A | 7/1992 | Marocco |
| 5,179,441 | A | 1/1993 | Anderson et al. |
| 5,184,826 | A | 2/1993 | Hall, Jr. |
| 5,209,483 | A | 5/1993 | Gedney et al. |
| 5,210,602 | A | 5/1993 | Mintzer |
| 5,221,088 | A | 6/1993 | McTeigue et al. |
| 5,226,660 | A | 7/1993 | Curchod |
| 5,228,697 | A | 7/1993 | Gulick et al. |
| 5,233,544 | A | 8/1993 | Kobayashi |
| 5,246,232 | A | 9/1993 | Eccher et al. |
| 5,247,835 | A | 9/1993 | Howell |
| 5,259,617 | A | 11/1993 | Soong |
| 5,269,177 | A | 12/1993 | Miggins et al. |
| 5,297,796 | A | 3/1994 | Peterson |
| 5,303,925 | A | 4/1994 | Rawson |
| 5,322,289 | A | 6/1994 | Abrams et al. |
| 5,332,225 | A | 7/1994 | Ura |
| 5,342,051 | A | 8/1994 | Rankin et al. |
| 5,342,054 | A | 8/1994 | Chang et al. |
| 5,375,844 | A | 12/1994 | Waud |
| 5,377,541 | A | 1/1995 | Patten |
| 5,395,116 | A | 3/1995 | Blaakman |
| 5,419,563 | A | 5/1995 | Abrams et al. |
| 5,435,561 | A | 7/1995 | Conley |
| 5,437,457 | A | 8/1995 | Curchod |
| 5,441,256 | A | 8/1995 | Hackman |
| 5,441,269 | A | 8/1995 | Henwood |
| 5,447,311 | A | 9/1995 | Viollaz et al. |
| 5,469,627 | A | 11/1995 | Denny et al. |
| 5,471,383 | A * | 11/1995 | Gobush et al. ............ 700/91 |
| 5,472,205 | A | 12/1995 | Bouton |
| 5,474,298 | A | 12/1995 | Lindsay |
| 5,482,283 | A | 1/1996 | Wall |
| 5,486,002 | A | 1/1996 | Witler et al. |
| 5,492,329 | A | 2/1996 | Kronin |
| 5,501,463 | A | 3/1996 | Gobush et al. |
| 5,575,719 | A | 11/1996 | Gobush et al. |
| 5,582,552 | A | 12/1996 | Hofmeister |
| 5,586,940 | A | 12/1996 | Dosch et al. |
| 5,589,628 | A | 12/1996 | Braly |
| 5,609,534 | A | 3/1997 | Gebhardt et al. |
| 5,616,832 | A | 4/1997 | Nauck |
| 5,623,459 | A | 4/1997 | Iwamura et al. |
| 5,625,577 | A | 4/1997 | Kunii et al. |
| 5,634,855 | A | 6/1997 | King |
| 5,638,300 | A | 6/1997 | Johnson |
| 5,672,809 | A | 9/1997 | Brandt |
| 5,682,230 | A | 10/1997 | Anfinsen et al. |
| 5,688,183 | A | 11/1997 | Sabatino et al. |
| 5,694,340 | A | 12/1997 | Kim |
| 5,697,791 | A | 12/1997 | Nashner et al. |
| 5,707,298 | A | 1/1998 | Chovanes |
| 5,709,610 | A | 1/1998 | Ognjanovic |
| 5,779,241 | A | 7/1998 | D'Costa et al. |
| 5,779,555 | A | 7/1998 | Nomura et al. |
| 5,792,000 | A | 8/1998 | Weber et al. |
| 5,792,001 | A | 8/1998 | Henwood |
| 5,798,519 | A * | 8/1998 | Vock et al. ............ 250/206.1 |
| 5,803,823 | A | 9/1998 | Gobush |
| 5,803,826 | A | 9/1998 | Perrine |
| 5,863,255 | A | 1/1999 | Mack |
| 5,879,246 | A | 3/1999 | Gebhardt et al. |
| 5,899,822 | A | 5/1999 | Yamgishi et al. |
| 5,916,040 | A | 6/1999 | Umazume |
| 5,989,135 | A | 11/1999 | Welch |
| 6,034,723 | A | 3/2000 | Fujimori |
| 6,042,483 | A | 3/2000 | Katayama |
| 6,042,492 | A | 3/2000 | Baum |
| 6,079,612 | A | 6/2000 | Tung |
| 6,185,850 | B1 | 2/2001 | Erkel |
| 6,186,002 | B1 | 2/2001 | Lieberman et al. |
| 6,186,910 | B1 | 2/2001 | Kobayashi |
| 6,195,090 | B1 | 2/2001 | Riggins, III |
| 6,213,888 | B1 | 4/2001 | Kawaguchi et al. |

(56) References Cited

U.S. PATENT DOCUMENTS

| | | |
|---|---|---|
| 6,215,532 B1 * | 4/2001 | Takagi et al. .................. 349/11 |
| 6,224,499 B1 | 5/2001 | Ogg |
| 6,231,453 B1 | 5/2001 | Jebe |
| 6,241,622 B1 | 6/2001 | Gobush et al. |
| 6,286,364 B1 | 9/2001 | Aoyama et al. |
| 6,292,130 B1 | 9/2001 | Cavallaro et al. |
| 6,293,802 B1 | 9/2001 | Ahlgren |
| 6,305,853 B1 * | 10/2001 | Bishay et al. ................. 396/351 |
| 6,320,173 B1 | 11/2001 | Vock et al. |
| 6,328,660 B1 | 12/2001 | Bunn, III |
| 6,390,934 B1 | 5/2002 | Winfield et al. |
| 6,398,670 B1 | 6/2002 | Engelhardt et al. |
| 6,410,990 B2 | 6/2002 | Taylor et al. |
| 6,431,990 B1 | 8/2002 | Manwaring |
| 6,441,745 B1 | 8/2002 | Gates |
| 6,488,591 B1 | 12/2002 | Gobush et al. |
| 6,500,073 B1 | 12/2002 | Gobush et al. |
| 6,506,124 B1 | 1/2003 | Manwaring et al. |
| 6,533,674 B1 | 3/2003 | Gobush |
| 6,561,917 B2 | 5/2003 | Manwaring |
| 6,592,465 B2 | 7/2003 | Lutz et al. |
| 6,602,144 B2 | 8/2003 | Manwaring et al. |
| 6,616,543 B1 | 9/2003 | Gobush et al. |
| 6,638,175 B2 | 10/2003 | Lee et al. |
| 6,897,966 B2 * | 5/2005 | Cohn ........................... 356/601 |
| 6,928,194 B2 * | 8/2005 | Mai et al. ...................... 382/284 |
| 2001/0043757 A1 | 11/2001 | Asakura |
| 2002/0103035 A1 | 8/2002 | Lindsay |
| 2002/0173364 A1 | 11/2002 | Boscha |
| 2002/0173367 A1 | 11/2002 | Gobush et al. |

* cited by examiner

ONE CAMERA STEREO SYSTEM

FIELD OF THE INVENTION

The present invention relates to a single camera that can capture two views of a desired scene. More specifically, the present invention uses a beam splitting mirror and a front surface mirror arranged to present a second viewing angle of the scene being observed.

BACKGROUND OF THE INVENTION

Golf equipment manufacturers currently spend a large amount of time and money on research and development related to better golf clubs and golf balls. Their innovation has led to the development of golf clubs and balls with a wide range of performance characteristics to account for many different types of golfers. Golf clubs may have varying shaft lengths or stiffness. Golf clubs may be manipulated to have different head characteristics, such as loft or lie angle. They may even be manufactured with various combinations of materials in order to attain a specific coefficient of restitution (COR).

Similarly, golf balls have been developed and researched in a similar manner. Golf balls may have solid cores, semi-solid cores, or even fluid cores. They may be manufactured using injection molding processes or they may use a winding process. Even the covers have been manipulated to have a desired number of dimples or dimple arrangements, which aid in increasing or decreasing the lift and drag coefficients of the ball.

The innovations and efforts expended to produce optimal golf equipment, with specifications that meet the requirements set by professional golf associations, are aimed at providing golfers with the best chances of success. However, once a club and ball leave a manufacturer, the performance of the equipment depends largely on the technique and skill of an individual player. Thus, even the most advanced equipment may not be able to correct or fully compensate for flaws in a player's swing.

Many methods and devices have been developed in order to assist players in obtaining an optimal swing. These methods typically consist of acquiring images of a player swinging a golf club and making contact with a golf ball. In a most rudimentary system, photographs of a player's swing, possibly from different angles, may assist a player in correcting their swing. In more advanced systems, a club and ball may be tagged using a set of markers. In combination with a camera system, this can be a powerful tool for analyzing the swing of a player. Typically, the markers placed on the equipment are selected to create a high contrast on the images of the swing captured by the camera. In one example, the markers may be black dots on the surface of a white ball. A strobe fired at the ball during impact captures the black dots on a high contrast white background. The use of black dots, however, may not generate sufficient contrast to allow such a system to be used in an outdoor environment.

As a result, there have been improvements in the types of markers used in more advanced systems that can generate a higher contrast image that is possible with black dots. Two examples of markers in this category are retroreflective markers and fluorescent markers. Retroreflective markers may be manufactured using a variety of materials. These markers may then be placed onto golf equipment. Retroreflective markers are typically used because they return more light to a source than a white diffuse surface. This is because retroreflective markers are designed to reflect a large percentage of concentrated light as a narrow beam. This is in contrast to a white diffuse surface that reflects light in all directions. Examples of the use of retroreflective markers in monitoring a player's golf swing may be found in U.S. Pat. Nos. 5,471,383, 4,158,853, and 6,241,622, the entireties of which are incorporated herein by reference thereto.

Fluorescent markers are also employed to analyze a player's golf swing. Fluorescent markers may also be manufactured using a variety of materials. However, in contrast to other types of markers, fluorescent markers only reflect light within a range of a desired wavelength. Therefore, when white light hits a fluorescent marker, a portion of the spectrum of the light will excite the fluorescent marker to only return light within a certain wavelength range. Fluorescent markers also return more light to a source than a white diffuse marker. Examples of these types of markers, in combination with camera systems and filters, are described in U.S. Patent Application No. 2003/0130054, the entirety of which is incorporated herein by reference thereto.

Typically, prior camera systems utilized only one type of marker for the objects being monitored. In other words, prior systems typically did not combine different markers. When multiple types of markers have been used, the monitoring systems essentially used two separate camera systems to capture images of the different markers. U.S. Patent Application No. 2002/0155896, for instance, uses two sets of two cameras to capture images of the club and images of the ball. Thus, the monitoring resulted in a complex event scene.

There have been other improvements to swing analysis systems. For instance, prior camera systems that acquire images typically encounter problems with noise and unwanted artifacts. Newer digital cameras typically employ a shutter and a CCD, among other components, to acquire an image. The CCD may be selectively activated and deactivated to acquire an image. This typically reduces the noise and artifacts that are included in an image. However, in many imaging systems that are used to acquire images of a player's swing and/or contact with a golf ball, ambient light can distort the image or captured images and reduce accuracy and prevents an accurate analysis of a players swing.

A continuing need exists for an apparatus and method for accurately and consistently analyzing a golf players swing and the resulting flight characteristics of a golf ball.

SUMMARY OF THE INVENTION

In many golf applications, camera systems are often used to gather three dimensional coordinate information by marking an object in space and imaging at least two pictures of the object from two viewpoints with a camera, such as a CCD camera. Previous one camera methods often required a scale marking to be placed on the object being measured to measure three dimensional information, such as depth. The present invention allows one camera to create more accurate three dimensional information of the position and orientation of an object without scale marking used in previous methods.

One camera systems often require the markers placed on a ball to be placed at precisely known points on the surface of the ball. As shown in U.S. Pat. No. 5,471,383, which is incorporated herein by reference, a one camera system with precisely located markers often results in a much larger error when estimating side angle than a two camera system that does not require precisely located markers. The present invention allows the improved accuracy of a two camera system to be realized by one camera, beam splitter, and a mirror.

In one embodiment, the present invention includes a camera system comprising a single camera comprising an imaging sensor capable of acquiring two perspective views of a single scene of interest. In order to provide an image with sufficient resolution, it is preferred that the resolution of the camera is about 25 pixels/inch or greater. More preferably, the resolution is about 100 pixels/inch or greater, and most preferably the resolution of the camera is about 200 pixels/inch or greater.

In this embodiment, the size of the single scene of interest is preferably about 12 square inches or greater. More preferably, the size of the scene of interest is about 36 square inches or greater, and most preferably the size of the scene of interest is about 100 square inches or greater.

In one embodiment, the camera system is capable of acquiring two perspective views of the single scene of interest based on at least two mirrors. Preferably, one of the mirrors comprises a front surface mirror and the other mirror comprises a mirror capable of transmission and reflection. To aid in acquiring the two perspective views of the single scene of interest, the ratio of transmission to reflection of the mirror is preferably about 5:5. In other embodiments, the ratio of transmission to reflection may be changed to any desired ratio, such as 3:7, 4:6, 6:4, or 7:3.

In some embodiments, the camera system may be used to image one or more objects that are selectively positioned within the single scene of interest. These objects may include, but are not limited to, a golf club or a golf ball.

Many different types of cameras may be used to acquire the two perspective views. Preferably, the camera is a multishutter camera. More preferably, the camera is capable of acquiring multiple frames, and most preferably the camera is capable of acquiring multiple images on a single frame.

In another embodiment, the present invention comprises a camera system including a single camera having an imaging sensor. This embodiment also includes a mirror and a beamsplitter. The mirror and beamsplitter are preferably configured to provide two different perspective views of a scene of interest onto the imaging sensor of the camera.

In one embodiment, the camera may be positioned such that it faces the scene of interest. In another embodiment, the camera is positioned such that it does not face the scene of interest. The resolution of the camera is preferably about 200 pixels/inch or greater, although it may be varied according to a variety of factors including, but not limited to, the size of the scene of interest. In one embodiment, the size of the scene of interest is about 26 square inches or greater. To aid in directing light towards the single scene of interest, the ratio of transmission to reflection of the beamsplitter is about 5:5.

In another embodiment, the present invention comprises an apparatus for analyzing the kinematics of an object. The apparatus includes a camera positioned to permit the camera to capture two different perspective views of the scene of interest simultaneously. In one embodiment, the camera includes a CCD. Also included at least one golf ball having a plurality of markers. A beam splitting mirror and a front surface mirror are positioned to direct light from the strobe lamp onto the scene of interest. In one embodiment, the beam splitting mirror has a ratio of transmission to reflection of about 5:5.

In this embodiment, the markers are selectively positioned on the surface of the golf ball in order to reflect or emit light. In one embodiment, the markers include retroreflective markers responsive to on-axis lighting. In another embodiment, the markers include fluorescent markers responsive to light within a predetermined wavelength.

In another embodiment, the present invention comprises a method for analyzing the kinematics of an object. The method includes acquiring two perspective views of a scene of interest based on a single camera having an imaging sensor. The two perspective views are preferably acquired by using two reflective surfaces to direct light towards the scene of interest. The two reflective surfaces are also capable of directing light from the scene of interest towards the single camera.

DETAILED DESCRIPTION OF THE PREFERRED EMBODIMENTS

Figure 1:
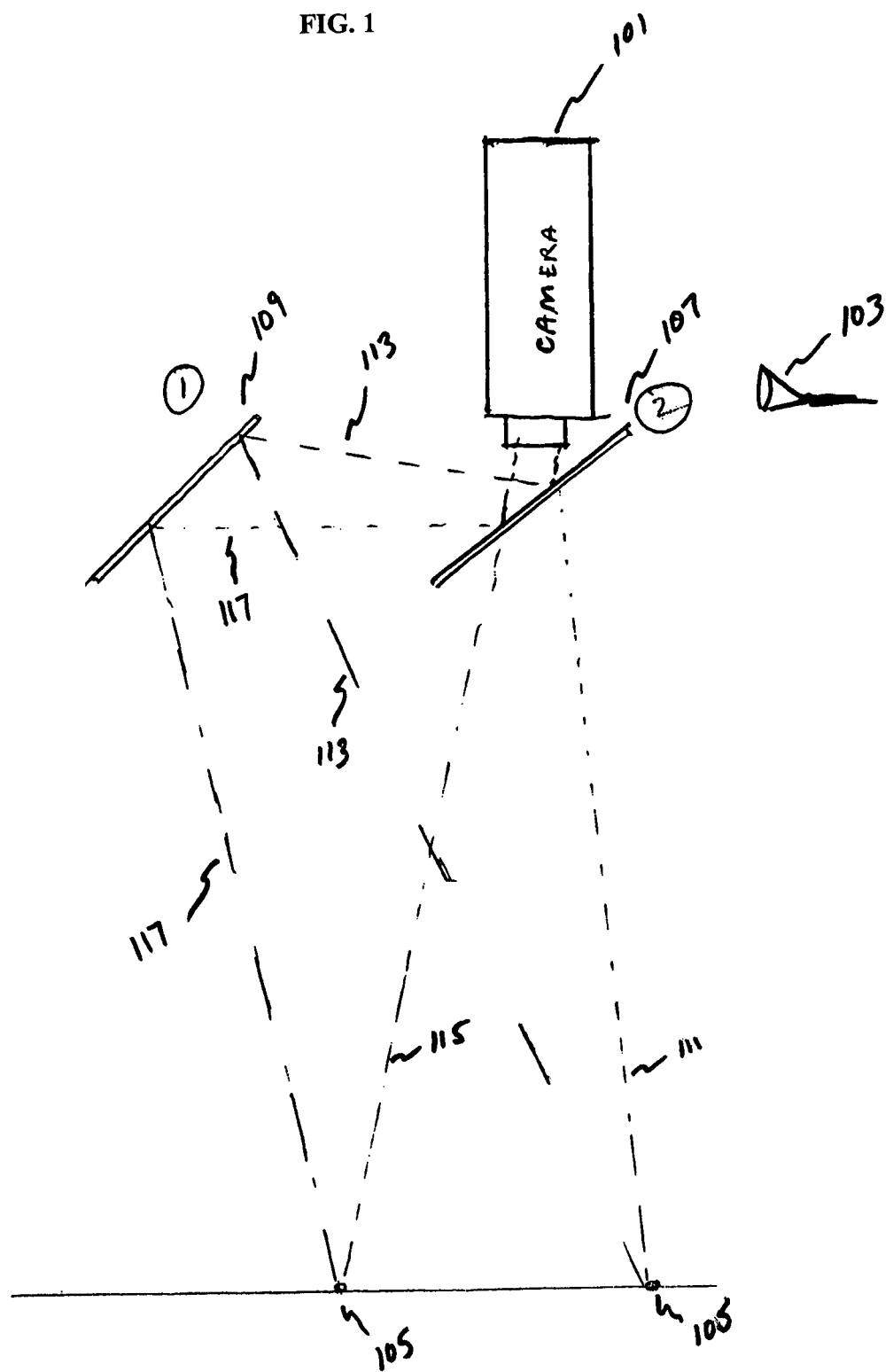
FIG. 1 is a diagram showing an exemplary embodiment of the present invention.

In many golf applications, camera systems are often used to gather three dimensional coordinate information by marking an object in space and imaging at least two pictures of the object from two viewpoints with a camera, such as a CCD camera. Previous one camera methods often required a scale marking to be placed on the object being measured to measure three dimensional information, such as depth. The present invention allows one camera to create more accurate three dimensional information of the position and orientation of an object without scale marking used in previous methods.

One camera systems often require the markers placed on a ball to be placed at precisely known points on the surface of the ball. As shown in U.S. Pat. No. 5,471,383, which is incorporated herein by reference, a one camera system with precisely located markers often results in a much larger error when estimating side angle than a two camera system that does not require precisely located markers. The present invention allows the improved accuracy of a two camera system to be realized by one camera, beam splitter, and a mirror.

The present invention comprises a one camera system that may be used to measure club and ball kinematics. The present invention is capable of capturing images of a club that is in motion, both before and after it strikes a ball. Additionally, the present invention is capable of capturing images of a ball, both before and after it has been struck. By capturing images of the club and ball, it is possible to analyze the motion of the club to determine how it may affect the trajectory of a golf ball. This analysis may then be confirmed by analyzing actual ball flight.

The present invention relates to a one camera stereo system. According to one aspect of the present invention, a single camera system is configured to capture two views of a desired area. Two reflectors are selectively positioned with respect to the single camera in order to provide the camera with a view of the desired area from two different angles. Each reflector, either alone or in combination, directs light to the scene of interest and then back to the camera. By selectively activating a light source, the single camera system is able to capture images of an object located within the scene of interest from two different angles on the same image frame.

It is desired that the camera is able to obtain images of a desired area from two different perspectives. In a preferred embodiment, the camera 101 is used to capture images of an object such as a golf ball, that is within the scene of interest. Preferably, the camera 101 is able to take multiple images of the golf ball to analyze the kinematics of the ball. The camera does not have to be facing the scene of interest. The camera is preferably able to obtain images from at least two different perspectives while being selectively positioned in any desired manner.

It is desired that the direction in which the camera faces may be positioned such that it forms any desired angle with respect to the scene of interest. For the purposes of this description, the scene of interest is considered to be an area that the club or ball traverses. In one embodiment, the camera may be oriented less than about 90 degrees with respect to the scene of interest. In another embodiment, the camera may be positioned such that its optical axis or line of sight forms an angle of about 35 degrees or less with respect to the scene of interest. In yet another embodiment, the camera may be oriented at about 15 degrees or less with respect to the scene of interest.

In some embodiments, the camera may be positioned such that forms an angle of between about 175 and about 135 degrees with respect to the scene of interest. In another embodiment, the angle may be between about 135 and 80 degrees with respect to the scene of interest. In yet another embodiment, the angle may be between about 85 and 95 degrees with respect to the scene of interest. In other embodiments, the opening of the camera may be positioned such that it directly faces the scene of interest, or such that it faces about 180 degrees away from the scene of interest.

Many different types of cameras may be used. In one embodiment, a multi-frame method may be employed. This method is well known to those skilled in the art, and involves taking multiple images in different frames and then placing the frames over one another. One example of such a camera is the PixelFly high performance digital camera sold by the Cooke Corporation.

In another embodiment, a method that uses multiple strobing in a single frame may be used. In one example of such a method, the shutter of the camera is maintained in an open position for a desired period of time. While the shutter is open, the image sensor of the camera is maintained in an activated state, so that the camera is able to acquire multiple images on the same frame. This method is analogous to using an analog camera that uses film with low sensitivity and maintains the shutter of the cameras in an open position. Because the shutter is continuously open, multiple images may be acquired onto the same frame by using the strobe lamp 103.

In yet another embodiment, a multishutter system is employed. An example of a multishutter system is the Pulnix TM6705AN camera, which is described in U.S. Pat. No. 6,533,674 B1 and incorporated herein by reference. In a multishutter system, the shutter of the camera remains open. The camera also includes a CCD which may be selectively activated. At desired intervals, the CCD of the camera may be activated and deactivated in order to acquire images on the same frame. A multishutter camera allows multiple images to be acquired while minimizing the amount of background noise present in a picture.

In one embodiment, a single camera comprising an imaging sensor is capable of simultaneously acquiring two perspective views of a single scene of interest on a single frame. In order to acquire images of the scene of interest from two different perspectives, at least two reflective surfaces may be used. In one embodiment, one of the surfaces is semi-transmissive, and the other surface is substantially reflective. In a preferred embodiment, any type of beam splitting mirror 107 known to those skilled in the art may be used. The size, shape, and reflective properties of the mirrors may be chosen according to a particular application.

Preferably, the beam splitting mirror is 50% transmissive and 50% reflective. However, the ratio of transmission to reflection may be changed according to a particular application. This may be based on the distance from the scene of interest to the image sensor. The ratio of the transmissive to reflective properties of the mirror may be based on the optical path of each mirror 107-109 from the golf ball 105. In one embodiment, the ratio of transmission to reflection is 7:3. More preferably, the ratio is 6:4, and most preferably the ratio is 5:5. In other embodiments, the ratio's of transmission to reflection may be reversed. For example, the ratio of transmission to reflection may be 3:7 or 4:6.

Preferably, mirror 109 is a front surface mirror. A front surface mirror minimizes the distortion of light that is reflected from its surface. This is well know to those skilled in the art. It is desirable to have the light that passes through the beam splitter 107 reflect off of mirror 109 and down to the golf ball 105. Any distortion of the light beam caused by the mirror 109 will alter the final destination of the light. In other embodiments, any type of mirror known to those skilled in the art may be used, though the mirror should be chosen to minimize light beam distortion.

The angles of each of the mirrors are chosen in order to direct the light towards desired points where the golf ball or golf club will pass, as shown in FIG. 1. In one embodiment, the angle of the mirrors is chosen according to the placement of the camera. For the purposes of this description, the scene of interest is considered to be an area that a club or ball will be traversing. The angle described is the angle of each mirror with respect to the point within the scene of interest. In such an embodiment, each mirror has an angle that is within about 10 degrees or less of the angle of the other mirror. More preferably, the angle of each mirror is within 5 degrees or less of the angle of the other mirror. Most preferably, the angle of each mirror is within 2 degrees or less of the angle of the other mirror. In such embodiments, the minimum angle is understood to be about 0.1 degrees.

In another embodiment, the angle of each mirror may be varied independently. Each mirror is preferably adjusted so that there is much overlap as possible while maintaining a desired scene of interest. In one embodiment, the angle of each mirror may be between about 180 and about 90 degrees. In another embodiment, the angle of each mirror may be between about 160 and about 110 degrees. In yet another embodiment, the angle of each mirror may be between about 120 and about 140 degrees.

In one embodiment, the camera's optical axis comprises a line of sight that extends from the focal center of the camera. In this embodiment, mirror 107 splits light that travels along the optical axis, directing part of it towards a desired area within the scene of interest. The other part of the light traveling along the optical axis is directed towards mirror 109, which then directs it towards the desired area from a different angle. This results in two different perspectives of the desired area within the scene of interest. The angle between the two different perspectives from the optical axis to the scene of interest is preferably about 2 degrees or less. More preferably, the angle between the two different perspectives from the optical axis to the scene of interest is about 5 degrees or less, and most preferably the angle is about 10 degrees or less.

In one embodiment, the angle of each mirror may be varied such that the two perspectives overlap. Preferably, the percentage overlap of the two perspectives is about 50% or less. More preferably, the percentage overlap of the two perspectives is about 70% or less, and most preferably the percentage overlap is about 90% or less.

In one embodiment, the size of the scene of interest may be varied. Preferably, the size of the scene of interest is about 12 sq. in. or greater. More preferably, the size of the scene of interest is about 36 sq. in or greater, and most preferably the size of the scene of interest is about 100 sq. in. or greater.

The resolution of each of the cameras may be varied as desired. An increased resolution may increase the costs associated with each camera. However, camera costs should be balanced with the need for accurate images. Preferably, the resolution of each camera is about 25 or greater pixels/inch for the scene of interest. More preferably, the resolution of each camera is about 100 or greater pixels/inch, and most preferably the resolution of each camera is about 200 or greater pixels/inch for the scene of interest.

In order to allow the camera to generate images of objects within the scene of interest, a light source is preferably present. The light source preferably generates light for a desired period of time. This light preferably reflects off the mirrors described above to reach the scene of interest. Once the light reflects off the objects within the scene of interest, it once again reflects off the mirrors and passes to the camera, thereby generating an image.

According to a preferred embodiment of the present invention, the strobe lamp 103 is used to generate flashes that illuminate the golf ball 105. In one embodiment, the strobe lamp 103 is capable of generating two or more flashes at different times while the golf ball 105 is in motion. Alternatively, the strobe lamp 103 is capable of illuminating the scene of interest of the camera for a duration of time equal to or greater than the time differential between a first and second shuttering of the camera.

The light generated by the strobe lamp 103 may be filtered in order to illuminate the golf club and golf ball with light having desired wavelengths. Any filter known to those skilled in the art may be used. The wavelengths of light that are allowed to pass through the filter may depend on any number of factors. In a preferred embodiment, the wavelengths that are allowed to pass through the filter depend on the types of filters 109 that are placed in front of the camera and the types of reflectors that are used on the golf ball. In one embodiment, as described in more detail below, limited spectrum markers may be used on the surface of a golf ball. Limited spectrum markers typically respond to light within a narrow range of wavelengths. The filters placed in front of the strobe lamp preferably allows light to pass that is within 60 nm of the excitation wavelength of the limited spectrum markers. More preferably, the filter allows light to pass that is within 40 nm of the excitation wavelength. Most preferably, the filter allows light to pass that is within 20 nm of the excitation wavelength of the limited spectrum markers.

In order to increase the contrast of the markers in a given image, a filter may also be placed before the camera. This filter may be chosen according to the filter used before the strobe lamp, the types of markers present on the objects, or both. In a preferred embodiment, the wavelengths of light that are permitted to pass through the filters are determined by the types of reflectors that are used on the golf ball. As discussed in more detail below, either retroreflective markers or fluorescent markers are placed on the surface of a golf ball.

In one embodiment, the camera filter allows light to pass that is within 60 nm of the emission wavelength of a marker. In another embodiment, the camera filter allows light to pass that is within 40 nm of the emission wavelength of a marker. In yet another embodiment, the camera filter allows light to pass that is within 20 nm of the emission wavelength of a marker.

The present invention may be used with any types of markers. In some embodiments, as described above, limited spectrum markers may be used. In other embodiments, high intensity markers may be used. As described below, these markers may have any desired properties, and may be placed at any desired point on the surface of an object.

In an exemplary embodiment, retroreflective markers and fluorescent markers may be employed, either alone or in combination. In an exemplary embodiment, the present invention may be used to acquire images of golf equipment, including, but not limited to golf clubs and golf balls. In some embodiments, it may be desirable to acquire images of a combination of golf equipment. In such embodiments, it may be preferable to distinguish between different equipment by exclusively using retroreflective or fluorescent markers on each type of equipment. Several examples of how different club markers and ball markers can be used to differentiate the club and ball are described in U.S. patent application Ser. No. 10/656,882, filed on Sep. 8, 2003 under attorney docket no. 20002.0311.

In one embodiment, a plurality of markers may be placed at different points on the surface of the golf club. The different points may include the shaft, toe, heel, or sole of the club. In an exemplary embodiment, the placement of the markers is chosen in order to measure desired characteristics of the swing of the club. The placement of the markers may be varied in order to measure kinematic characteristics of the club such as loft or lie angle and rotation of the club during the swing. Those skilled in the art will recognize that the placement of the retroreflective markers may be varied according to a particular application.

In a preferred embodiment, the present invention is used to measure the position and orientation of a golf ball. To aid in determining the kinematics of one or more golf balls, it is preferable to place a plurality of markers on the surface of the golf ball. The placement of the markers on the surface of the golf ball is preferably determined based on the kinematic characteristics that are desired. In some embodiments, it may be desirable to alter the placement of the markers in order to measure ball characteristics such as spin or rotation.

Those skilled in the art will recognize that the placement of the markers may be varied according to a particular application. Further discussion of marker locations, orientation, size, and shape are described in U.S. application Ser. No. 10/002,174 filed on Dec. 5, 2001 and also in U.S. application Ser. No. 10/656,882 filed on Sep. 8, 2003, which are incorporated by reference in their entireties.

The markers placed on the surface of the club or golf ball 105 may have a substantially circular shape. Preferably, each of the circular markers has a radius of between 0.10 and 5 mm. More preferably, each of the markers has a radius of between 0.50 and 3 mm, and most preferably each of the markers has a radius of between 0.75 and 2.5 mm.

The present invention is not intended to be limited to substantially circular markers. In other embodiments, the shape of each marker may be changed as desired. For example, at least one marker may have a geometric shape other than a circular one, such as a triangular, rectangular or square shape. Additionally, at least one marker may be a line or may have the shape of a symbol, such as a plus sign, an alphanumeric character such as a "T" or an "O", a star, an asterisk, or the like.

In another embodiment, the markers may comprise a combination of circular markers and one rectangular marker. In this embodiment, five substantially circular markers are placed on the surface of the golf ball in such a manner that light that illuminates the ball will be reflected by each of these markers. Each of the five markers are arranged such that they form a polygon that has a space in the middle. The space in the middle is preferably sufficient for the rectangular marker to be placed within. The rectangular polygon may have any dimensions, however it is desired that either the length or the width is disproportionately large compared to the other dimension.

In one embodiment of the present invention, at least seven markers are placed on the surface of the golf ball 105 in such a manner that light that illuminates the ball will be reflected by each of the markers. The distance between each of the markers may be varied according to a particular application. In one embodiment, six of the markers may be arranged in a substantially pentagonal arrangement, with five markers defining the corners of the pentagonal shape as projected on the ball and one marker located substantially at the center of the pentagon. The seventh marker may be located substantially close to the center marker. The seventh marker also may have a different size or shape from the center marker or from any of the other markers on the ball.

In a preferred embodiment, the seventh marker is substantially circular, but has a smaller radius than either the other six markers or at least from the center marker disposed nearby. For example, the seventh marker may have a diameter that is about 75 percent or less of the diameter of the other markers or the center marker, and more preferably may be about 50 percent or less. In yet another embodiment, the seventh marker has a diameter of about 25 percent or less of the diameter of the other markers or the center marker. It is possible, however, that practical considerations, such as the type of markers and monitoring equipment used, may limit how small the marker may be. For instance, in both embodiments discussed above, the seventh marker also may have a diameter that is about 5 percent or greater than the diameter of the other markers in order to ensure that the reflection of this marker is adequately captured and analyzed by the monitoring system.

One advantage of having a seventh marker on a pentagonal pattern is that it may provide more direct information about the rotation of the ball by providing a marker pattern that is not repeated until the pattern has rotated 360°. Absent this additional marker, a traditional six marker pentagonal pattern is symmetrical for every 72° of rotation. That is, a conventional pentagonal marker pattern on a ball can appear the same every time the pattern is rotated 72°. This symmetry of the pattern may require a monitoring system to iteratively determine how a ball is rotating by analyzing multiple mathematical solutions of ball rotation based on the marker images captured followed by elimination of unrealistic or impossible spin characteristics. The addition of a seventh marker significantly reduces potential symmetry issues by providing a more robust pattern that is not repeated until it has been rotated 360°.

In addition to using a seventh marker in the manner described above to create a pattern that is only repeated after it has been fully rotated, other patterns likewise may be used that are not repeated until the pattern has rotated more than 72° but less than 360°. For instance, a pattern may be selected that is not repeated until it has rotated by about 90° or more, by about 120° or more, or by about 180°.

Preferably, the radius of the seventh markers is between 0.20 and 1 mm smaller than the radius of the other six markers. More preferably, the radius of the seventh marker is between 0.35 and 0.75 mm smaller, and most preferably, the radius of the seventh marker is between 0.45 and 0.60 mm smaller than the radius of the other six markers.

In other embodiments, it may be desirable to place the seventh marker in a different location. Alternately, it may be desirable to place markers in other locations outside the pentagonal arrangement in order to determine different kinematic properties of the golf ball 105. In other embodiments, markers may be added or removed, and may be placed in any arrangement desired by those skilled in the art.

Typically, retroreflective markers can reflect about 1000 percent or more light than a white diffuse surface reflects, although the intensity of the light reflected from a retroreflective marker can reduce significantly as the angle α between the light source, marker, and camera increases. In one embodiment, of the present invention, the angle α between the light source, marker, and the mirror that reflects light into the camera should be reduced. This is because the camera opening does not need to be facing the scene of interest. Rather, the mirrors 107 and 109 direct light towards the camera, according to the present invention. Preferably, a system using retroreflective markers maintains the angle α at about 20° or less, more preferably at about 10° or less, and even more preferably at about 5° or less.

Under proper conditions, fluorescent markers also may be used to return more light within a certain spectrum or at a particular wavelength than can be reflected by a white diffuse surface. For instance, fluorescent markers can emit about 100 percent more light than a white diffuse surface when the spectrum of light includes wavelengths of light within the excitation wavelength of the fluorescent marker.

Thus, under the proper conditions, retroreflective markers and fluorescent markers can reflect more light than a white diffuse surface. This feature of retroreflective markers and fluorescent markers is useful for creating higher contrast between the illuminate markers and the remainder of the image captured by the camera. By increasing the contrast, background noise such as reflections from surfaces other than from the markers can be reduced or eliminated completely.

For example, because retroreflective markers are capable of reflecting light at a high intensity, the amount or intensity of light from a light source such as a strobe may be reduced so that surfaces in the field of view of the camera other than the markers will reflect low levels of light. The camera sensitivity also may be adjusted so that these low intensity reflections are not registered appreciably on the camera sensor. Use of fluorescent markers also allows for yet another way to help reduce or eliminate background reflections in addition to the advantages they provide from having high reflectance. Fluorescent dyes are known for being able to receive light at an excitation wavelength that is converted into light at another wavelength.

In a preferred embodiment, it is desirable to place a plurality of fluorescent markers on a golf ball. The fluorescent markers may be excited by any wavelength of light, depending on a particular application. Preferably, the fluorescent markers placed on the golf ball react to blue light (app. 460-480 nm). For example, when orange fluorescent markers are illuminated by blue light, they reflect orange light back (app. 600 nm) at a greater intensity that a white diffuse surface. Other fluorescent markers, such as green fluorescent markers, may also respond to blue light.

It is desirable to have the camera system of the present invention only acquire image of the light reflected from the fluorescent markers. In order to do this, the amount of light that reflects back from the parts of the golf ball that are not covered with fluorescent markers should be substantially minimized. In a preferred embodiment, this is achieved by using a strobe filter that passes substantially only blue light. By limiting the wavelengths of light that are permitted to pass through the strobe filter, images of the golf ball may be captured without causing saturation and enhancements of artifacts in the image.

In a preferred embodiment, the strobe lamp 103 generates a flash of white light. Preferably, no more than 20 percent of light outside the blue wavelength is permitted to pass through the strobe filter. More preferably, no more than 10 percent of light outside the blue wavelength is permitted to pass through the strobe filter. Most preferably, no more than 5 percent of light outside the blue wavelength is permitted to pass through the strobe filter. Those skilled in the art will recognize that the blue wavelength comprises a range between approximately 460 and 480 nm.

About 80 percent of blue light is preferably permitted to pass through the strobe lamp filter. More preferably, about 90 percent of blue light is permitted to pass through, and most preferably 100 percent of blue light is permitted to pass through the strobe filter. Any combination of the percentages of blue light, and light outside the blue wavelength that are permitted to pass through the filter may be used. Though a preferred embodiment of the present invention is described with respect to blue light, those skilled in the art will recognize that any wavelength of light may be used depending on the fluorescent markers and the filters. This includes, but is not limited to, light in the visible and infrared spectrums.

In an exemplary embodiment, a set of retroreflective markers may be placed on the surface of the golf club or ball. In this embodiment, it is desirable to have orange light reflect back to the camera 101. However, because retroreflective markers reflect 1000 percent of the light that a diffuse white surface receives, the amount of orange light that is generated by the strobe lamp 103 should be limited. By limiting the amount of orange light that is permitted to pass through the strobe filter, images of the golf ball may be captured without causing saturation and enhancements of artifacts in the image. In some embodiments, a combination of both retroreflective and fluorescent markers may be used. In this embodiment, one type of marker may be used on the club while the other type may be used on the ball.

In a preferred embodiment, the marker intensity should be readily identifiable from the background when they are reflecting or emitting light. Preferably, the marker intensity should be about 50% or greater than a white diffuse surface. More preferably, the marker intensity should be about 100% or greater than a white diffuse surface. Most preferably, the marker intensity should be about 300% or greater than a white diffuse surface.

In this embodiment, about 30 percent of orange light is preferably permitted to pass through the strobe lamp filter. More preferably, about 20 percent of orange light is permitted to pass through, and most preferably 10 percent of orange light is permitted to pass through the strobe filter.

The light that is permitted to pass from the strobe lamp 103, through the strobe filter, is preferably directed towards the golf ball using at least two mirrors. In a preferred embodiment, the light from the strobe lamp 103 initially hits beam splitting mirror 107. In a preferred embodiment, the beam splitting mirror 107 is 50% transmissive and 50% reflective. Each of the mirrors 107 and 109 direct light generated by the strobe lamp towards the ball 105.

The images of the golf ball 105 are preferably taken at two different instances while the ball is in motion. In order to determine when the ball has been struck by a golf club, any device known to those skilled in the art may be used. Typically, this may include, but is not limited to, the use of an acoustic device, for example, a sound detection device. Such a device would detect the impact of the golf club with the golf ball, and thereby activate the strobe lamp 103 to generate light. Many methods and apparatus used to detect impact between the two objects are well known to those skilled in the art. Those skilled in the art will recognize that any type of device may be employed to determine impact and activate the strobe lamp 103.

Preferably, the time delay between the detection of contact between a golf club and a golf ball, and the signal to the camera 101 and/or the strobe lamp 103 is substantially minimized. Reducing the time between detection of contact and signaling may be important for accurately imaging the golf ball in motion. Preferably, the time delay between the contact and the signaling is between 1 and 5 microseconds. More preferably, the time delay is between 0.5 and 1.5 microseconds, and most preferably the time delay is between 0.15 and 0.25 microseconds.

In a preferred embodiment, a filter is placed before the opening of the camera 101, as described above. In a preferred embodiment, the filter is orange. The orange filter allows only orange light to pass through to the camera 101. Preferably, the filter allows less than 5 percent of light that is not orange to pass through. More preferably, the filter allow less than 2 percent, and most preferably the filter allow less than 1 percent of light that is not orange to pass through.

Any type of filter known to those skilled in the art may be used. Though the preferred embodiment is described with respect to an orange filter, it will be recognized that any filter may be used to allow any color or combinations of colors to pass. The color of the filter, and the amount and type of light that is allowed to pass through may depend on a particular application.

Figure 2:
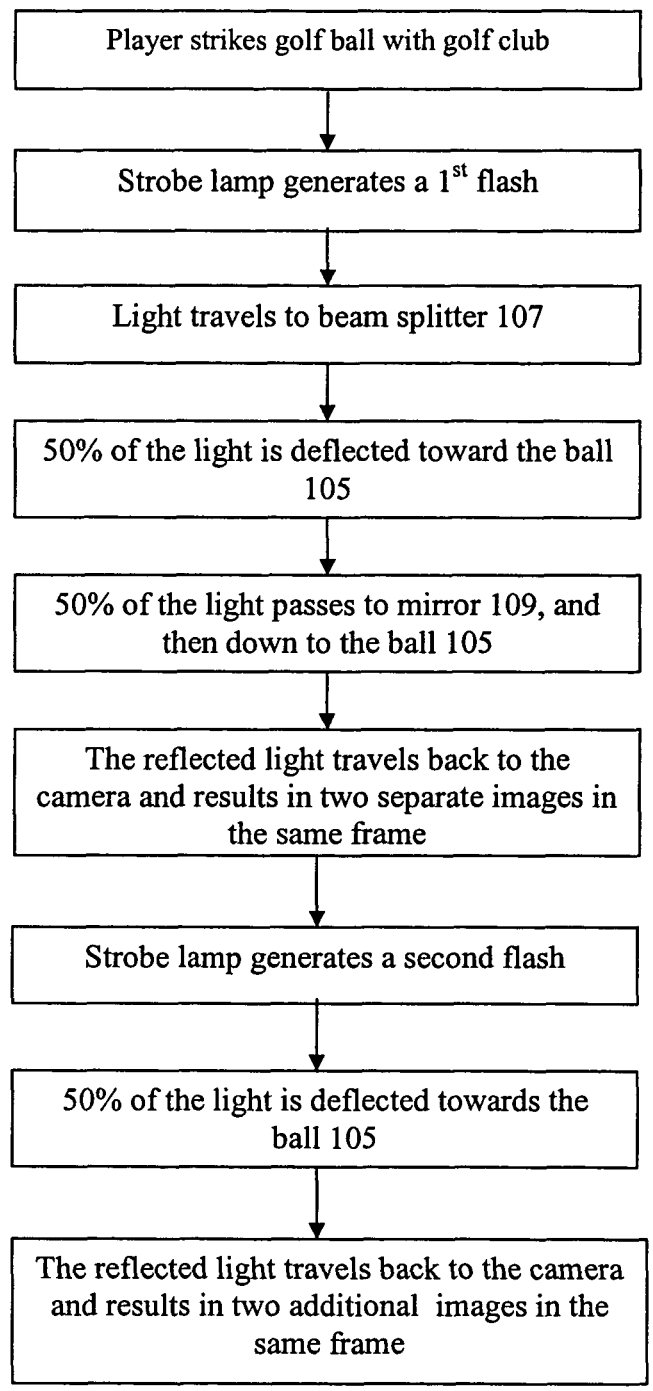
FIG. 2 is a flow chart showing exemplary steps according to the present invention.

According to the preferred method of the present invention, a golf ball is imaged using the apparatus described above. Referring to FIG. 2, a player might hit a golf ball within the scene of interest shown in FIG. 1. In accordance with the present invention, a golf ball may be imaged in flight. In a preferred embodiment, the golf ball is imaged in the moments substantially after impact with the golf club.

The strobe lamp 103 generates a first flash of light substantially immediately after the golf club impacts the golf ball. Preferably, the strobe lamp generates the flash between 100 and 200 microseconds after impact. More preferably, the strobe lamp 103 generates the first flash between 50 and 100 microseconds after impact, and most preferably the lamp 103 generates the first flash between 25 and 50 microseconds after impact. As discussed previously, when used with fluorescent markers, the light emitted from the strobe lamp 103 is preferably filtered to pass only blue light. When used with retroreflective markers, the light from the strobe lamp 103 need not be filtered for any particular wavelength.

The two mirrors of the present invention allow a golf ball at a given position to be imaged from two different angles. In an embodiment that uses retroreflective markers, after a flash of light is generated by the strobe lamp 103, the light travels to beam splitter 107. Because the beam splitter is preferably 50% transmissive and 50% reflective, the light may then travel in two directions.

In a preferred embodiment, 50% of the light is reflected by the mirror 107, and travels downward along path 111. The path 111 of the light is determined by the angle of the placement of the strobe light 103 and the angle of the mirror 107 with respect to the ground. The light that travels along path 111 strikes the golf ball, reflects off of the markers, and travels back to the camera 101 substantially along path 111.

The other 50% of the first flash generated by the strobe lamp 103 passes through beam splitting mirror 107, reflects off of mirror 109, and travels along path 113 down to the golf ball. The path 113 of the light is determined by the placement of the strobe light 103, the angle of mirror 107 with respect to the ground, and the angle of mirror 109 with respect to the ground. The light that travels along path 113 strikes the golf ball, reflects off of the markers, and travels back to the camera 101 substantially along path 113.

Figure 3:
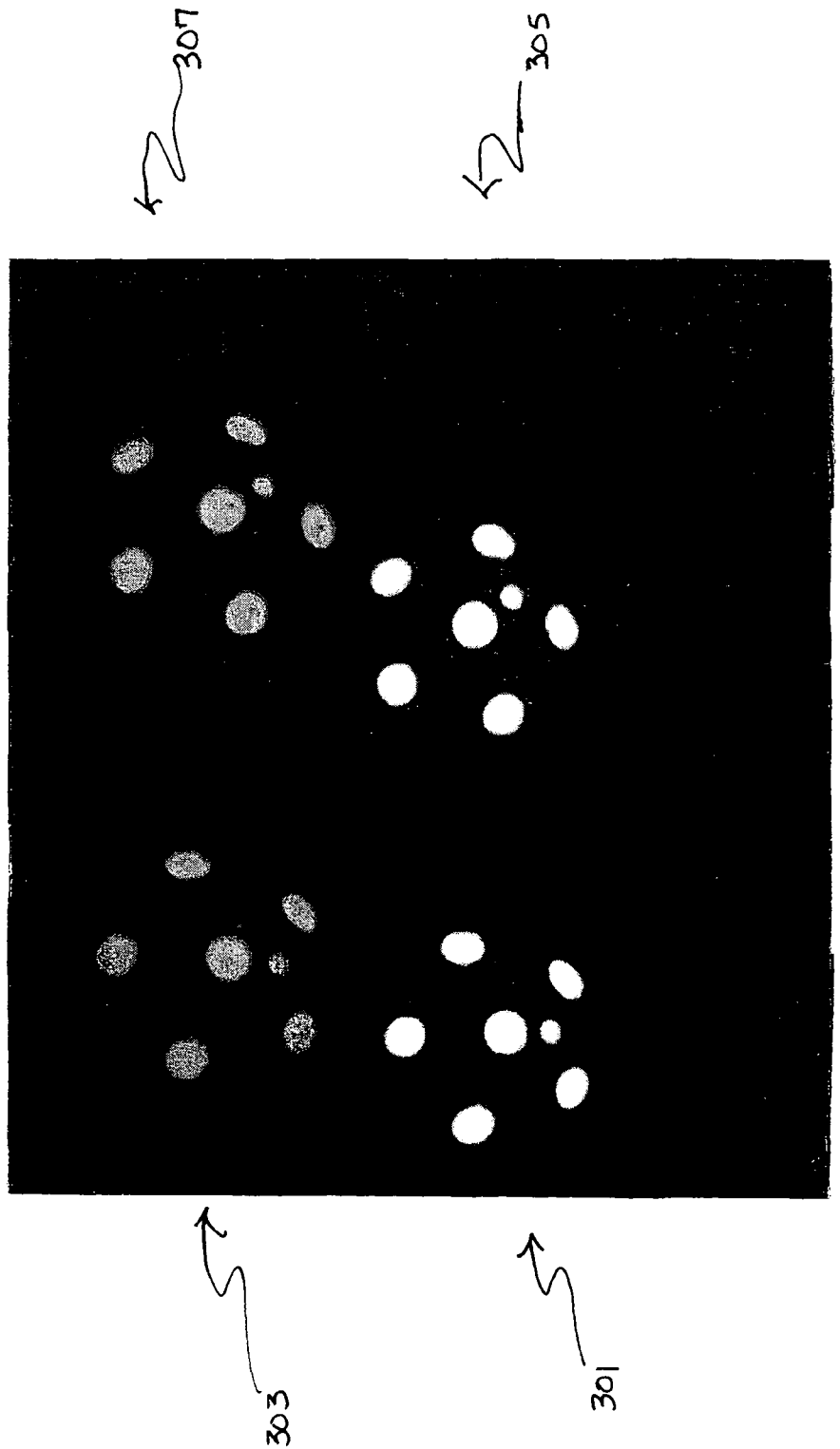
FIG. 3 is a diagram showing an exemplary image according to the present invention.

The light from the first flash that travels along paths 111 and 113 travel to the ball, and back to the camera at substantially the same time. They result in two images of a golf ball, each taken from a different angle, as shown in FIG. 3. Image 301 is generated by reflected light traveling along path 111 and image 303 is generated by light traveling along path 113. In a preferred embodiment, image 301 is brighter than image 303. The brighter image 301 results from the shorter path that the light has to travel.

In embodiments that use fluorescent markers, the light does not have to travel along this path. This is because fluorescent markers typically do not require on-axis lighting. In such an embodiment, the light source may be placed at any desired point that is capable providing sufficient light to illuminate the scene of interest. Light that is emitted by the fluorescent markers travels back towards the camera along the same paths described above.

At substantially the same time that the first flash is generated by the strobe lamp 103, the CCD of the camera 101 is activated in order to acquire the images of the golf ball. The CCD may be activated for any desired period of time. Typically, the activation time is limited in order to avoid streaking or saturation of an image. Preferably, the CCD is activated for 100 microseconds. More preferably, the CCD is activated for 50 microseconds, and most preferably the CCD is activated for 10 microseconds.

The duration of the first flash may be determined by those skilled in the art. In a preferred embodiment, the duration of the flash is determined based on object speed. In a preferred embodiment, the flash is on at substantially the same time that the CCD is in an activated state. Preferably, the duration of the flash is between 1,000 and 50 microseconds. More preferably the duration of the flash is between 50 and 10 microseconds, and most preferably the duration of the flash is between 10 and 5 microseconds. As will be appreciated by those skilled in the art, the duration of the flash and the CCD activation may be altered according to a particular application.

After the first flash from the strobe light 103, a second flash is generated. The second flash once again passes from the strobe light to the beam splitter 107. As described with respect to the first flash, 50% of the light is reflected by the mirror 107. The light is reflected down to the golf ball, which has now moved to a second position, along path 115. Path 115 is dependent on the position on the camera 103 and the angle of the beam splitter 107. The light that reaches the ball then reflects off the markers and returns to the camera 101 substantially along path 115.

The other 50% of the light passes through beam splitter 107, reflects off mirror 109, and travels down to the golf ball along path 117. Path 117 is preferably determined by the placement of the camera 101, the angle of beam splitter 107 with respect to the camera axis, and the angle of mirror 109 with respect to the ground. Once the light reaches the golf ball, it reflects off the markers, and travels back to the camera 101 substantially along path 117.

The light from the second flash that travels along paths 115 and 117 travel to the ball, and back to the camera at substantially the same time. They result in two additional images of the golf ball, each taken from a different angle, as shown in FIG. 3. Image 305 is generated by the light from path 115 and image 307 is generated by the light from path 117. The two additional images 305 and 307 show the golf ball in its second position. In a preferred embodiment, image 305 is brighter than image 307. The brighter image 305 results from the shorter path that the light has to travel along path 115.

The duration of the second flash and the CCD activation is substantially similar to that described with respect to the first flash. However, in other exemplary embodiments, it may be desirable to increase or decrease the duration of the second flash and/or second CCD activation.

In a preferred embodiment, the intensity of the two flashes may be altered according to a particular application. In some applications, the intensity of the flashes may depend on one of the distance between the mirrors 107 and 109 and the distance between the mirrors 107-109 and the golf ball 105. In other embodiments, the intensity of the flash may depend on the distance between the camera 101 and the golf ball 105 and/or the distance between the strobe lamp 103 and the beam splitting mirror 107. As will be appreciated by those skilled in the art, the intensity of the light may be determined according to a variety of factors, and should be sufficient to provide the camera 101 with enough light to produce a suitable image without causing saturation. The suitability of an image may depend on the type of information that the image will be used to obtain.

Preferably, the time period between the first and second flashes generated by the strobe light 103 is between 600 microseconds and 2000 microseconds. More preferably, the time period between the flashes is between 800 microseconds and 1250 microseconds, and most preferably the time period between the flashes is between 900 microseconds and 1100 microseconds. In alternate embodiments, any combination of the preferred time periods may be employed. Of course those skilled in the art will recognize that the time period between the first and second flashes may be increased, decreased, or altered in any other manner, depending on a particular application.

In a preferred embodiment, as previously described, fluorescent markers that are reactive to blue light are placed on the surface of the golf ball 105. In this preferred embodiment, it is desirable to have substantially only blue light pass through the strobe filter. When the blue light passes through the filter, and along paths 111-117, it will excite the fluorescent markers to reflect orange light. The orange light passes back through paths 111-117, and eventually passes through the camera filter. In a preferred embodiment, the camera filter is orange, and thus allows only orange light to reach the camera 101.

In the event that other colors of light, other than blue, are able to pass through the strobe filter, they will pass through paths 111-117 and eventually reach the golf ball 105. However, the other colors of light will not excite the fluorescent markers. The other colors of light will also reflect off of the golf ball, and eventually reach the camera filter. However, once again, only orange light will be permitted to pass through the orange camera filter.

If a small amount of orange light passes through the strobe light filter, it will be allowed to pass through the camera filter, and will cause an image of the entire golf ball to be imaged. However, by substantially reducing the amount of light, other than blue light, that is able to pass through the strobe filter, the orange light received from the fluorescent markers will have a greater intensity than the orange light reflected off of the golf ball. Thus, the contrast between the image of the golf ball and the image of the markers will be very great, and will allow for a precise and accurate determination of the kinematics of the ball.

In an exemplary embodiment of the present invention, retroreflective markers may be used on the surface of the golf club. As previously described, this embodiment requires a filter to allow a small amount of orange light to illuminate the golf club. When the orange light passes through the strobe filter, and along paths 111-117, it eventually strikes the retroreflective markers on the club. The retroreflective markers reflect back the orange light, which travels back over paths 111-117. In this exemplary embodiment, the camera filter is orange, and thus only allows the orange light to pass to the camera 101.

In the event that other colors of light, other than orange, are able to pass through the strobe filter, they will pass through paths 111-117 and eventually reach the golf club. The other colors of light will also reflect off of the golf club, and eventually reach the camera filter. However, once again, only orange light will be permitted to pass through the orange camera filter.

In the exemplary embodiment that uses retroreflective markers, it is important to limit the amount of orange light that is able to pass through the camera filter. If too much orange light passes through the camera filter, and is imaged by the camera 101, a bleached image may result. Thus, in this embodiment, it is more important to limit the amount of orange light that passes through the filter than it is to remove other colors of light from passing through.

Figure 4:
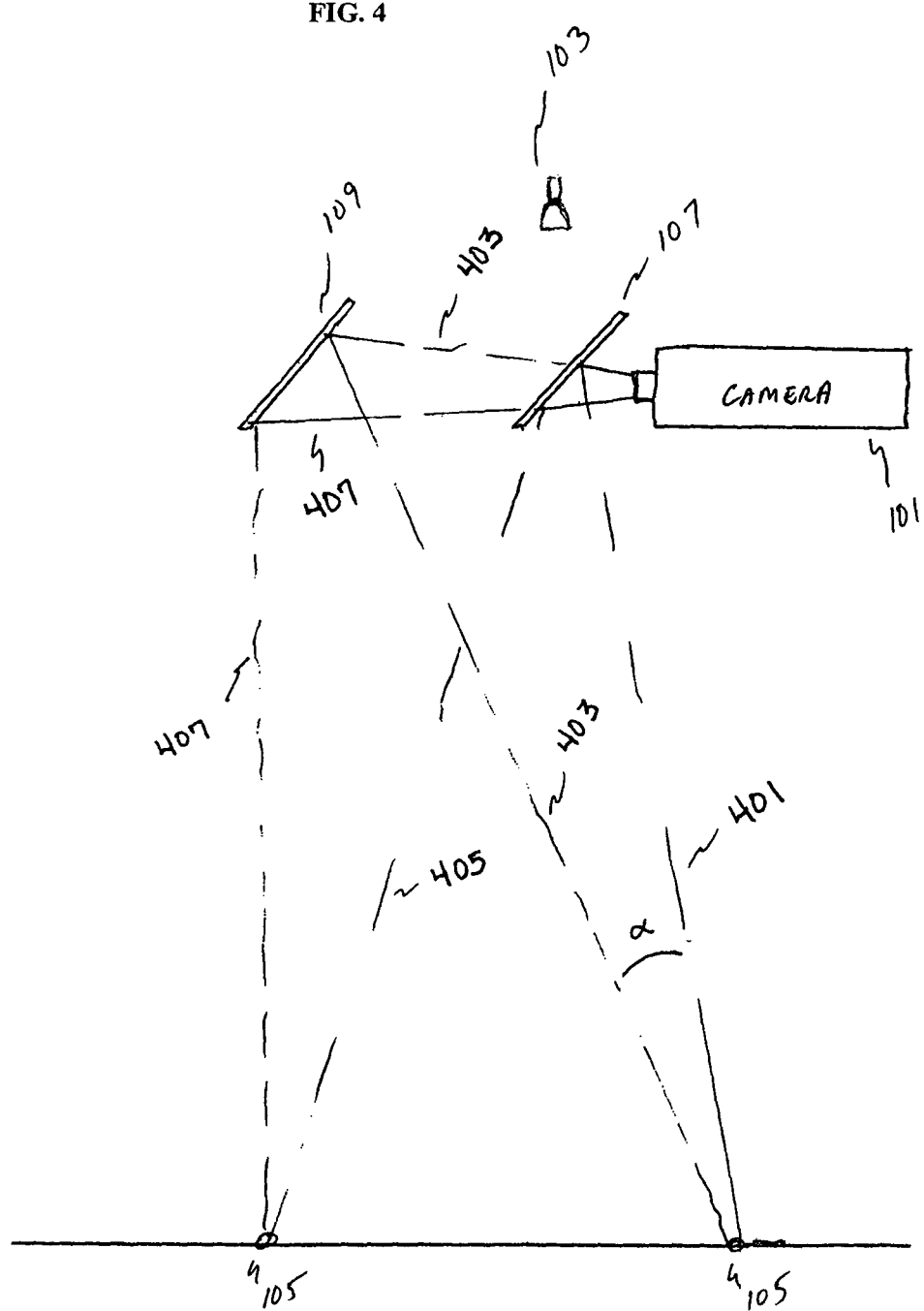
FIG. 4 is a diagram showing another exemplary embodiment of the present invention.

In another exemplary embodiment of the present invention, shown in FIG. 4, the position of the strobe lamp 103 and the camera 101 are interchanged. In this embodiment, the strobe lamp 103 faces towards the golf ball 105, and the camera 101 faces both of the mirrors. The apparatus of the exemplary embodiment is the same as described with respect to the embodiment shown in FIG. 1.

In the FIG. 4 embodiment, when the first flash of light is generated by the strobe lamp 103, 50% of the light is transmitted down towards the ball 105 along path 401. The other 50% of the light is reflected by the beam splitting mirror 107, reflected off of mirror 109, and directed down towards the golf ball 105 along path 403. The light reflects off the ball 105, and then travels back to the camera over substantially the same paths 401-403. As described with respect to FIG. 1, the light travels along paths 401 and 403 at substantially the same time.

After the first two images of the golf ball are acquired by the camera 101, the strobe lamp 103 generates a second flash. Preferably, 50% of the light from the second flash is transmitted by the beam splitting mirror 107, and travels towards the golf ball 105 in its second position along path 405. The other 50% of the light is reflected by the beam splitter 107, reflected off front surface mirror 109, and down towards the golf ball 105 in its second position along path 407. The light reflects off of the ball 105, and then travels back to the camera 101 over substantially the same paths 405 and 407. As described with respect to FIG. 1, the light travels along paths 405 and 407 at substantially the same time. The FIG. 4 embodiment will result in substantially the same images as shown in FIG. 3.

In other embodiments, more than two flashes may be used to acquire images of a golf ball. The number of images that are desired may depend on the type of analysis that needs to be performed. Of course, the filters that are placed in front of the strobe lamp 103, and the camera filter may be changed to allow different wavelengths of light to pass.

Figure 5:
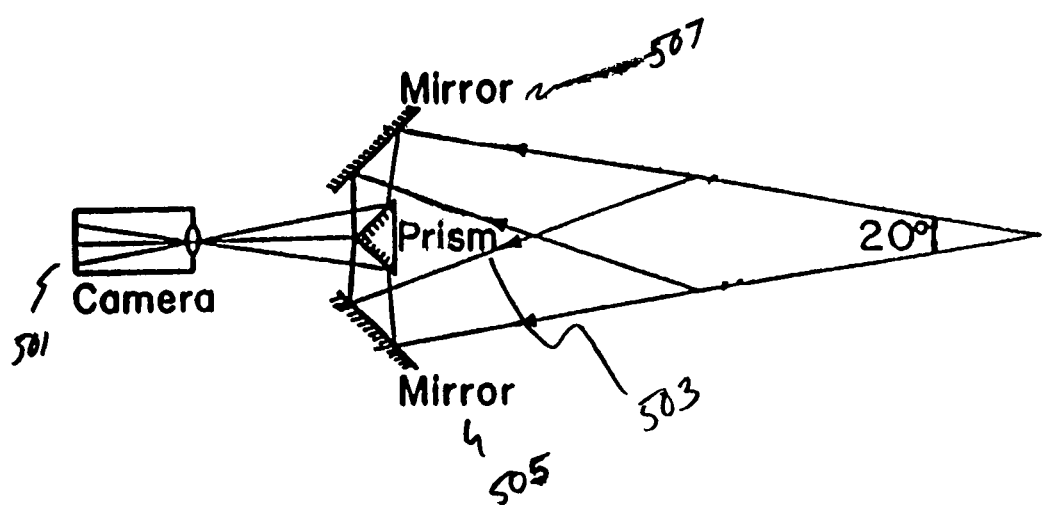
FIG. 5 is a diagram showing yet another exemplary embodiment of the present invention.

A preferred embodiment of the present invention is capable of using only one camera to acquire images that can be analyzed to determine the three dimensional characteristics of a golf ball. Accordingly, the camera may be placed in any orientation with respect to the scene of interest. Two exemplary orientations are described above with respect to FIGS. 1 and 4. In another embodiment, shown in FIG. 5, the camera 501 may be facing the scene of interest. In this embodiment, a prism 503 is selectively positioned between the camera 501 and the scene of interest. The prism 503 is preferably shaped like an isosceles triangle, and is positioned such that the unequal side is substantially parallel to the scene of interest. The apex of the prism preferably faces the camera, as shown in FIG. 5. In this embodiment, the prism affects light in a substantially similar manner to the beamsplitter described with respect to FIG. 1. In other embodiments, the prism 503 may be replaced by a mirror having the same shape.

In embodiments that use limited spectrum markers, such as fluorescent markers, the flash or light source (not shown) may be placed in any location that allows the scene of interest to be illuminated. In other embodiments that use retroreflective markers, the flash or light source may be positioned to provide on-axis lighting to the scene of interest. For example, the flash or light source may be positioned between the prism and the scene of interest. Alternately, the flash or light source may be a ring light disposed around the camera lens. Two mirrors 505 and 507 aid in directing light towards the camera 501.

When light from the flash illuminates the objects within the scene of interest, the light is reflected back towards the mirrors 505 and 507. The mirrors 505 and 507 then direct the light towards the prism 503, which then directs the light into the camera, as shown in FIG. 5. As shown in FIG. 5, the mirrors 505 and 507 are selectively positioned such that there is between about a 10 and 30 degree angle, and more preferably between about an 18 and 22 degree angle between the left and right lens center and the scene of interest.

Figure 6:
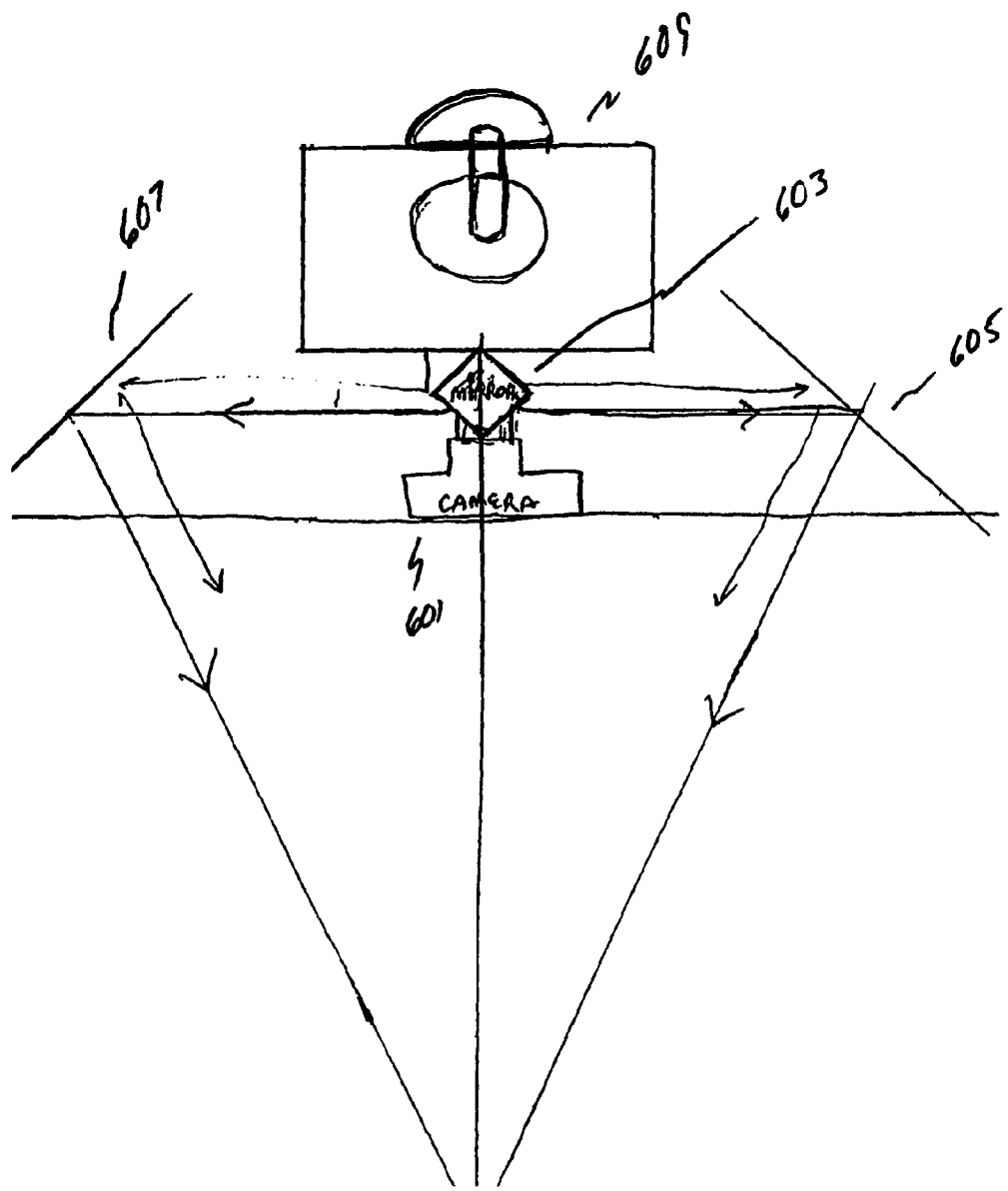
FIG. 6 is a diagram showing another exemplary embodiment of the present invention.

In another embodiment, shown in FIG. 6, the camera 601 may be facing about 180 degrees away from the scene of interest. A mirror 603 is selectively positioned in front of the camera. Preferably, the mirror 603 has four reflective surfaces, two of which may be used to help direct light from the light source to the scene of interest, and two of which may help direct light reflected or emitted from the scene of interest to the camera. Preferably, the mirror is square shaped. Two additional mirrors 605 and 607 are selectively positioned such that they are capable of deflecting light from mirror 603 onto the scene of interest, and then back to the camera 601. In this embodiment, light is generated by a strobe lamp 609 or other light source that is selectively positioned in front of mirror 603.

In embodiments that use limited spectrum markers, such as fluorescent markers, the strobe lamp 609 or other light source may be placed in any location that allows the scene of interest to be illuminated. In other embodiments that use retroreflective markers, the strobe lamp 609 or other light source may be positioned to provide on-axis lighting to the scene of interest. For example, the strobe lamp 609 or other light source may be positioned between the prism and the scene of interest. Alternately, the flash or light source may be a ring light disposed around the camera lens.

In the FIG. 6 embodiment, light generated by the strobe lamp 609 strikes the two top surfaces of mirror 603 that face away from the camera 601. Mirror 603 then deflects the light towards mirrors 605 and 607, which direct the light towards the scene of interest. Once the light strikes an object within the scene of interest, light is reflected or emitted back towards mirrors 605 and 607. The light from each of the mirrors 605 and 607 then strikes the two sides of mirror 603 that are facing the camera. This light is then deflected towards the camera 601, allowing images to be acquired.

In a preferred embodiment, the images, shown in FIG. 3, of the golf ball may be used to analyze the kinematics of a golf ball. This can be done using any number of methods which are known to those skilled in the art. Because the apparatus according to the present invention is symmetrical, both left and right handed golfers may use the system with substantially little rearrangement of the apparatus.

In alternate embodiments, the apparatus and method according to the present invention may not be limited to golf balls. The present invention may be used to acquire images of any types of objects, such as golf clubs, a baseball bat or ball, or a tennis bat or ball. In some embodiments, the present invention may be used to acquire images of only one object, such as a baseball, football, tennis ball, or the like. In other embodiments, the present invention may be used to acquire images of more than one image, such as a golf club and a golf ball. The images acquired according to the present invention may be used to analyze any characteristic of a ball in motion, such as flight path, trajectory, distance, or the like.

Although the present invention has been described with reference to particular embodiments, it will be understood by those skilled in the art that the invention is capable of a variety of alternative embodiments within the spirit of the appended claims.

The invention claimed is:

1. A camera system for monitoring the movement of golf equipment through a field of view, comprising:
    a single camera comprising an imaging sensor operable to simultaneously acquire two perspective views of an object at a first location along a trajectory within the field of view of the camera and simultaneously acquire two perspective views of the object at a second location along a trajectory within the field of view:
    wherein the two perspective views of a single field of view are based on at least two surfaces, wherein one of the surfaces is semi-transmissive and the other surface is substantially reflective.

2. The camera system according to claim 1, wherein one of the surfaces is a front surface mirror.

3. The camera system according to claim 1, wherein the camera is positioned such that the camera forms an angle of 5 degrees or less with respect to the field of view.

4. The camera system according to claim 1, wherein the camera is positioned such that the camera forms an angle of 90 degrees or less with respect to the field of view.

5. The camera system according to claim 1, wherein the camera is positioned such that the camera forms an angle of 180 degrees or less with respect to the field of view.

6. The camera system according to claim 1, wherein an angle between the two different perspectives from an optical axis to the scene of interest is preferably about 2 degrees or less.

7. The camera system according to claim 1, wherein an angle between the two different perspectives from an optical axis to the scene of interest is preferably about 5 degrees or less.

8. The camera system according to claim 1, wherein an angle between the two different perspectives from an optical axis to the scene of interest is preferably about 10 degrees or less.

9. The camera system according to claim 1, wherein the two perspectives overlap by about 50% or less.

10. The camera system according to claim 1, wherein the two perspectives overlap by about 70% or less.

11. The camera system according to claim 1, wherein the two perspectives overlap by about 90% or less.

12. The camera system according to claim 1, wherein the ratio of transmission to reflection is 5:5.

13. The camera system according to claim 1, wherein the ratio of transmission to reflection is 6:4.

14. The camera system according to claim 1, wherein the ratio of transmission to reflection is 7:3.

15. The camera system according to claim 1, wherein the ratio of transmission to reflection is 3:7.

16. The camera system according to claim 1, wherein the ratio of transmission to reflection is 4:6.

17. The camera system according to claim 1, wherein the resolution of said camera is about 100 or greater pixels/inch.

18. The camera system according to claim 1, wherein the size of the single field of view is about 12 square inches or greater.

19. The camera system according to claim 1, wherein the size of the single field of view is about 36 square inches or greater.

20. The camera system according to claim 1, wherein the size of the single field of view is about 100 square inches or greater.

21. The camera system according to claim 1, wherein one or more objects are selectively positioned within the single field of view, and wherein said objects comprise at least one of a golf club and a golf ball.

22. The camera system according to claim 1, wherein the camera is a multishutter camera.

23. The camera system according to claim 1, wherein the camera is operable to acquire multiple frames.

24. The camera system according to claim 1, wherein the camera is operable to acquire multiple images on a single frame.

25. A camera system, comprising:
    a single camera having an imaging sensor;
    a mirror; and
    a beamsplitter comprising a mirror configured and dimensioned for transmission and reflection;
    wherein said mirror and said beamsplitter are configured to provide two perspective views of an object at a first location along a trajectory within a field of view of the camera and two perspective views of the object at a second location along a trajectory within the field of view of the camera.

26. The camera system according to claim 25, wherein the camera does not face the field of view.

27. The camera system according to claim 25, wherein the resolution of said camera is about 200 or greater pixels/inch.

28. The camera system according to claim 25, wherein the ratio of transmission to reflection of the beamsplitter is about 5:5.

29. The camera system according to claim 25, wherein the size of the field of view is about 36 square inches or greater.

30. The system of claim 25, further comprising a moving object, wherein the minor and the beamsplitter are configured and dimensioned to obtain a first and second image of the moving object at a first position within the field of view and a third and fourth image of the moving object at a second position within the field of view.

31. An apparatus for analyzing the kinematics of an object, comprising:
    a camera positioned to permit the camera to capture two different perspective views of an object at a first location along a trajectory within a field of view of the camera simultaneously and two different perspective views of the object at a second location along a trajectory within the field of view of the camera;

at least one golf ball or club having a plurality of markers; and a beam splitting mirror and a front surface mirror, each of said mirrors positioned to direct light from a strobe lamp onto the field of view;

wherein the beam splitting minor transmits about 50% of light that strikes the beam splitting mirror's surface.

32. The apparatus according to claim 31, wherein said markers include retroreflective markers responsive to on-axis lighting.

33. The apparatus according to claim 31, wherein said markers include fluorescent markers responsive to light within a predetermined wavelength.

34. The apparatus according to claim 31, wherein said camera includes a CCD.

35. A method for analyzing the kinematics of an object, comprising:

acquiring two perspective views of an object at a first location along a trajectory within a field of view and two perspective views of an object at a second location along a trajectory within the field of view based on a single camera having an imaging sensor, wherein the acquiring comprises using a beamsplitter comprising a mirror configured and dimensioned for transmission and reflection.

36. The method according to claim 35, wherein said acquiring comprises using two reflective surfaces to direct light towards the field of view.

37. The method according to claim 35, wherein said acquiring further comprises using two reflective surfaces to direct light from the field of view towards the single camera.

* * * * *